United States Patent
Petrucelli

(10) Patent No.: US 8,015,864 B2
(45) Date of Patent: Sep. 13, 2011

(54) DIGITAL TIRE PRESSURE GAUGE WITH BLEED VALVE

(75) Inventor: Steven Petrucelli, Cranbury, NJ (US)

(73) Assignee: Measurement Ltd., Grand Cayman (KY)

( * ) Notice: Subject to any disclaimer, the term of this patent is extended or adjusted under 35 U.S.C. 154(b) by 40 days.

(21) Appl. No.: 12/478,455

(22) Filed: Jun. 4, 2009

(65) Prior Publication Data

US 2010/0307232 A1    Dec. 9, 2010

(51) Int. Cl.
    B60C 23/02    (2006.01)
(52) U.S. Cl. ....................................... 73/146.8
(58) Field of Classification Search .................. None
    See application file for complete search history.

(56) References Cited

U.S. PATENT DOCUMENTS

| | | | | |
|---|---|---|---|---|
| 2,501,801 A | * | 3/1950 | Wallin | 137/224 |
| 3,429,332 A | * | 2/1969 | Mazeika | 137/227 |
| D247,429 S | | 3/1978 | Teal | |
| D259,863 S | | 7/1981 | Eller | |
| 4,276,898 A | * | 7/1981 | Ross | 137/231 |
| D280,215 S | | 8/1985 | Huang | |
| D286,270 S | | 10/1986 | Huang | |
| D294,229 S | | 2/1988 | Bonazzi | |
| 4,748,845 A | | 6/1988 | Rocco et al. | |
| D300,729 S | | 4/1989 | Skaggs | |
| 4,827,764 A | | 5/1989 | Hwang | |
| 4,845,980 A | | 7/1989 | Weng | |
| 4,916,944 A | | 4/1990 | Ho-Chuan | |
| 4,924,697 A | | 5/1990 | Hunt et al. | |
| D314,159 S | | 1/1991 | O'Connor | |
| 4,998,438 A | * | 3/1991 | Martin | 73/146.8 |
| D316,980 S | | 5/1991 | Brinker et al. | |
| D317,880 S | | 7/1991 | Meehan | |
| 5,033,296 A | | 7/1991 | Huang | |
| D320,170 S | | 9/1991 | Hwang | |
| D320,756 S | | 10/1991 | Ohno et al. | |
| 5,117,684 A | | 6/1992 | Hwang | |

(Continued)

FOREIGN PATENT DOCUMENTS

DE    19837550 A1    2/1999

(Continued)

OTHER PUBLICATIONS

International Search Report dated Aug. 31, 2010 for related PCT application PCT/US2010/037493.

*Primary Examiner* — Lisa M Caputo
*Assistant Examiner* — Jermaine Jenkins
(74) *Attorney, Agent, or Firm* — Howard IP Law Group, PC

(57) ABSTRACT

A digital tire pressure gauge has a housing having a first and a second end. A port at the first end of the housing is adapted to engage with and open a needle valve of a tire valve stem. The gauge also includes a pressure sensor and a processor in electronic communication with the pressure sensor. A bleed valve is disposed in the housing and a bleed lever is in contact engagement with the bleed valve. When the port is coupled to the tire valve stem, in a first operational mode, the bleed valve is closed and an air pressure measurement is obtained. In a second operational mode, pressing the bleed lever causes the bleed valve to open and to allow air to be bled out from the tire via the pressure gauge.

23 Claims, 10 Drawing Sheets

U.S. PATENT DOCUMENTS

| | | |
|---|---|---|
| D331,371 S | 12/1992 | Weng |
| D335,465 S | 5/1993 | Garrison, III |
| D336,735 S | 6/1993 | Nulsen |
| D337,730 S | 7/1993 | Rosenfeld |
| D338,839 S | 8/1993 | Akins |
| D349,659 S | 8/1994 | Huang |
| D352,252 S | 11/1994 | Huang |
| D361,950 S | 9/1995 | Mascio |
| D366,845 S | 2/1996 | Handfield et al. |
| D366,846 S | 2/1996 | Handfield et al. |
| 5,540,268 A | 7/1996 | Mittal |
| 5,665,908 A * | 9/1997 | Burkey et al. ............. 73/146.8 |
| D390,140 S | 2/1998 | Germanton |
| D395,835 S | 7/1998 | Okuyama et al. |
| D402,997 S | 12/1998 | Campbell et al. |
| 5,875,413 A | 2/1999 | Vinci |
| D409,509 S | 5/1999 | Petrucelli et al. |
| D409,931 S | 5/1999 | Petrucelli et al. |
| D419,085 S | 1/2000 | Prus |
| D420,299 S | 2/2000 | Jahn |
| D427,092 S | 6/2000 | Wu |
| D427,093 S | 6/2000 | Wu |
| D440,893 S | 4/2001 | Van Zeyl |
| D440,894 S | 4/2001 | Van Zeyl |
| D440,895 S | 4/2001 | Van Zeyl |
| D441,674 S | 5/2001 | Van Zeyl |
| 6,279,599 B1 * | 8/2001 | Chen ........................ 137/228 |
| D447,970 S | 9/2001 | Cappiello et al. |
| D450,257 S | 11/2001 | Bressler et al. |
| D455,361 S | 4/2002 | Super et al. |
| D455,666 S | 4/2002 | Cappiello et al. |
| 6,385,554 B1 | 5/2002 | Wu |
| D458,857 S | 6/2002 | Tseng |
| D459,257 S | 6/2002 | Petrucelli |
| D459,668 S | 7/2002 | Petrucelli |
| D460,704 S | 7/2002 | Peele |
| D462,627 S | 9/2002 | Petrucelli |
| D469,706 S | 2/2003 | Huang |
| D474,124 S | 5/2003 | Krieger et al. |
| 6,595,046 B2 * | 7/2003 | Lemberger et al. ......... 73/146.3 |
| D488,082 S | 4/2004 | Durr et al. |
| D491,480 S | 6/2004 | Huang et al. |
| D492,608 S | 7/2004 | Fujioka |
| D496,602 S | 9/2004 | Shipman |
| D498,154 S | 11/2004 | Wang |
| 6,817,235 B2 | 11/2004 | Sapir |
| D501,146 S | 1/2005 | Durr et al. |
| 6,838,983 B1 | 1/2005 | Wong |
| D501,417 S | 2/2005 | Tseng |
| D501,418 S | 2/2005 | Wang |
| D502,214 S | 2/2005 | Davis et al. |
| D502,656 S | 3/2005 | Fujioka |
| D502,734 S | 3/2005 | Davis et al. |
| D502,735 S | 3/2005 | Davis et al. |
| D503,898 S | 4/2005 | Durr et al. |
| D504,630 S | 5/2005 | Wang |
| D505,088 S | 5/2005 | Durr et al. |
| D505,871 S | 6/2005 | Little et al. |
| D505,872 S | 6/2005 | Durr et al. |
| D506,154 S | 6/2005 | Cowan et al. |
| 6,901,792 B2 | 6/2005 | Petrucelli |
| 7,013,722 B2 | 3/2006 | Little et al. |
| 7,040,153 B2 | 5/2006 | Kroll et al. |
| 7,100,435 B2 * | 9/2006 | Fujioka ........................ 73/146 |
| 7,185,533 B2 | 3/2007 | Lee et al. |
| 7,281,420 B2 | 10/2007 | Wrubel |
| 7,383,724 B2 | 6/2008 | Petrucelli |
| 7,721,592 B2 * | 5/2010 | Bucknell ................... 73/146.8 |
| 2002/0005066 A1 * | 1/2002 | Tanner et al. .................. 73/146 |
| 2003/0005758 A1 * | 1/2003 | Dotson ........................ 73/146 |
| 2005/0103108 A1 | 5/2005 | Little et al. |
| 2005/0138999 A1 | 6/2005 | Petrucelli |
| 2009/0109012 A1 | 4/2009 | Petrucelli |

FOREIGN PATENT DOCUMENTS

| | | |
|---|---|---|
| GB | 2169411 A | 7/1986 |
| WO | 9607568 | 3/1996 |

* cited by examiner

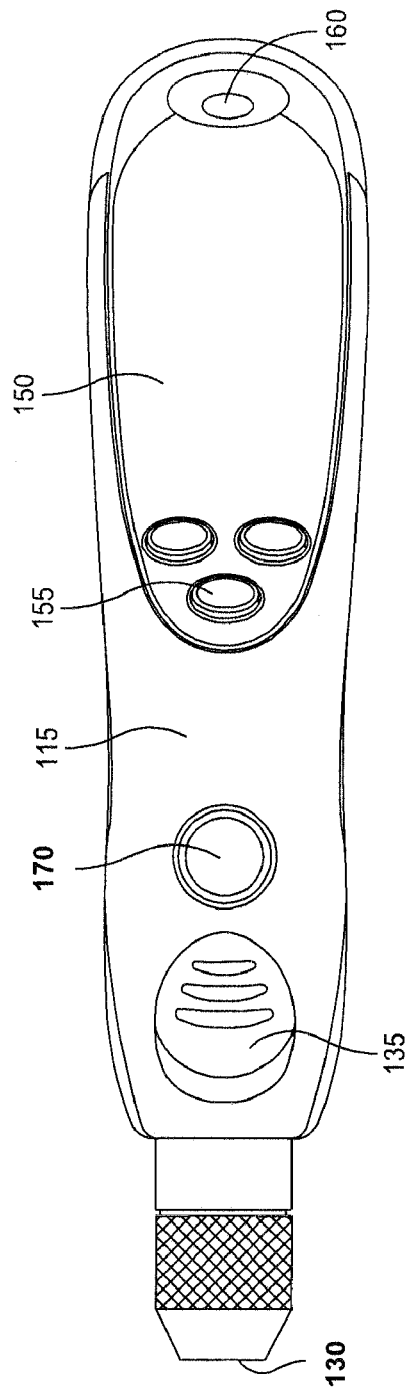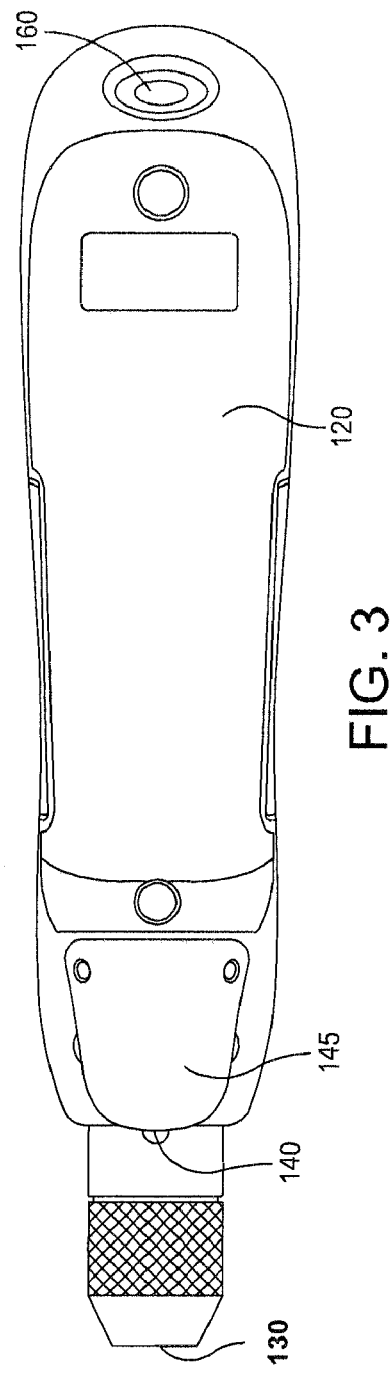
FIG. 2
FIG. 3

DIGITAL TIRE PRESSURE GAUGE WITH BLEED VALVE

FIELD OF INVENTION

The present invention relates to pressure measurement and pressure gauges, and more particularly to digital tire pressure gauges.

BACKGROUND

Pressure gauges are conventionally used for measuring the pressure of a gas or a liquid, such as an air pressure. Tire pressure gauges, as an example, measure the inflation pressures of vehicle tires, such information being useful for maintaining optimal tire performance and avoiding unnecessary wear. In some cases, a tire pressure gauge is temporarily coupled to a valve stem of a tire to measure the air pressure within the tire. In other cases, tire pressure gauges are mounted to the valve stem.

SUMMARY OF THE INVENTION

According to an embodiment of the invention, a digital tire pressure gauge includes a housing having a first and a second end. A port is positioned at the first end of the housing and is adapted to engage with and open a needle valve of a tire valve stem. A pressure sensor is disposed in the housing. The tire pressure gauge also includes a processor in electronic communication with the pressure sensor. A bleed valve is disposed in the housing. A bleed lever is in contact engagement with the bleed valve. When the port is coupled to the tire valve stem, in a first operational mode, the bleed valve is closed and an air pressure measurement is obtained. In a second operational mode, the bleed lever, when pressed, causes the bleed valve to open and to allow air to be bled out from the tire via the pressure gauge.

Another aspect of the invention includes a method for bleeding excess air from a tire. The method includes a step of engaging a port of tire pressure gauge to a valve stem of the tire. The tire pressure gauge includes a bleed valve in a switchable fluidic communication with the air in the tire and a bleed lever in contact with the bleed valve. The bleed lever is adapted to switch on and off the fluidic communication of the bleed valve with the air in the tire. The method then includes a step of pressing the bleed lever to cause at least some air to bleed out from the tire via the bleed valve in the pressure gauge.

BRIEF DESCRIPTION OF THE DRAWINGS

Understanding of the present invention will be facilitated by consideration of the following detailed description of the exemplary embodiments of the present invention taken in conjunction with the accompanying drawings, in which like numerals refer to like parts and in which:

FIG. 2 is a top view of the gauge of FIG. 1, according to an embodiment of the invention;

FIG. 3 is a bottom view of the gauge of FIG. 1, according to an embodiment of the invention;

DETAILED DESCRIPTION

Figure 1:
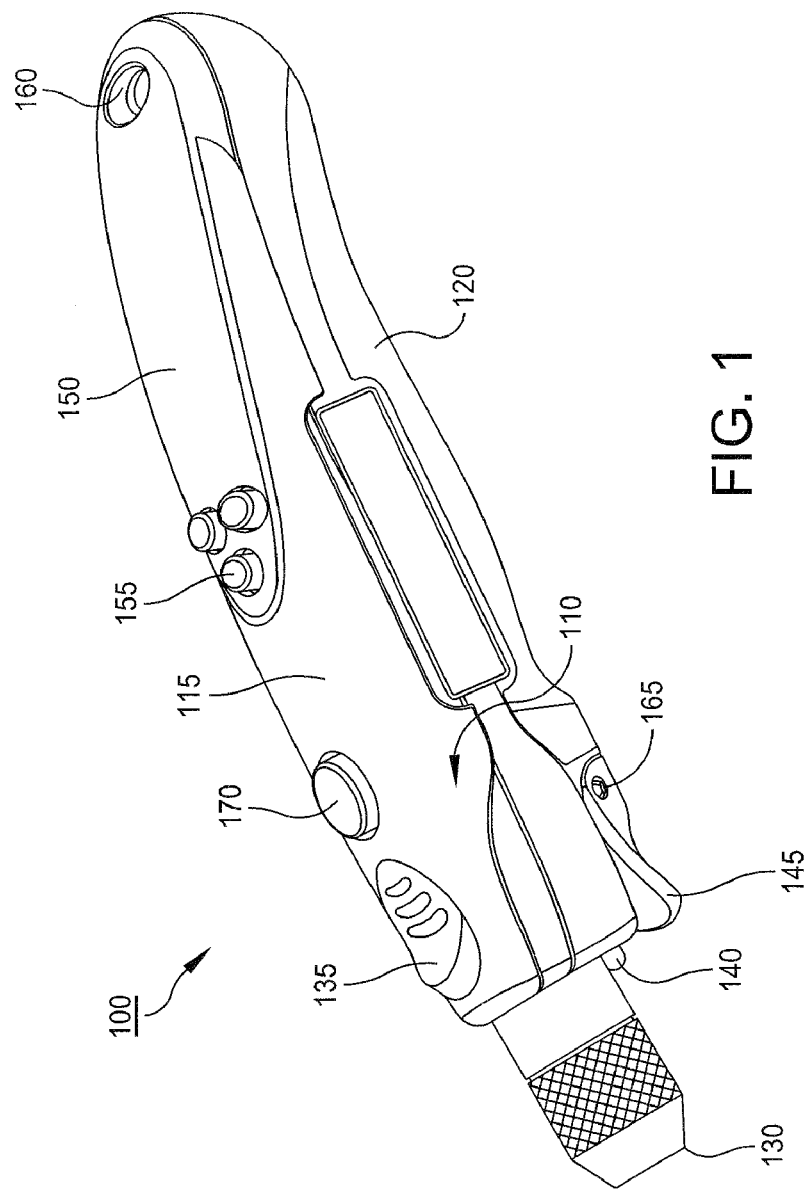
FIG. 1 is a perspective view of a digital tire pressure gauge, according to an embodiment of the invention.
Figure 4:
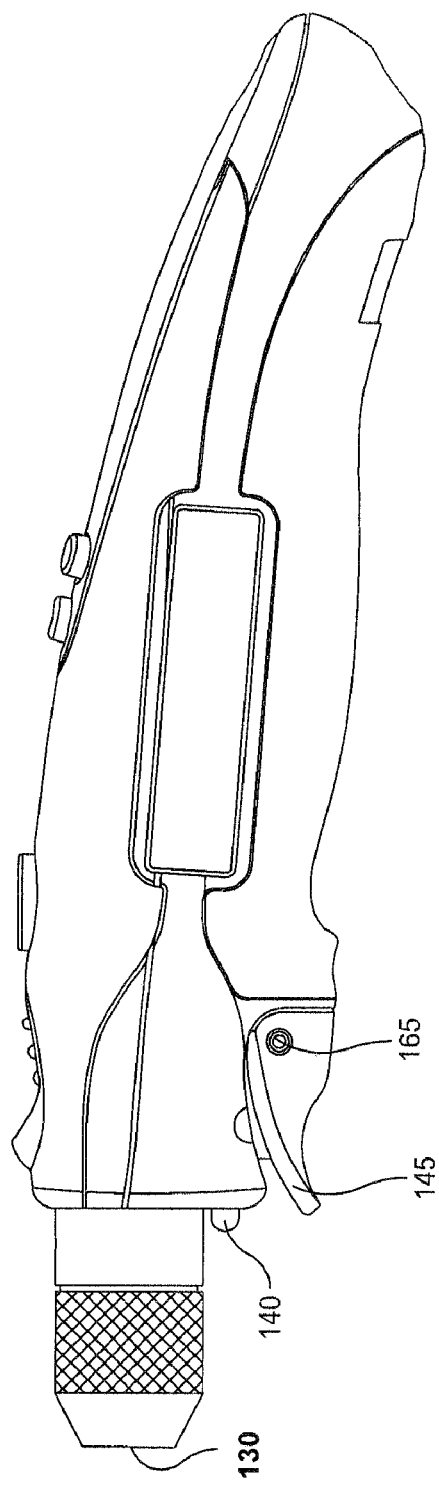
FIG. 4 is a side view of the gauge of FIG. 1, according to an embodiment of the invention.

It is to be understood that the figures and descriptions of the present invention have been simplified to illustrate elements that are relevant for a clear understanding of the present invention, while eliminating, for purposes of clarity, many other elements found in typical tire pressure gauges and digital tire pressure gauges. However, because such elements are well known in the art, and because they do not facilitate a better understanding of the present invention, a discussion of such elements is not provided herein. The disclosure herein is directed to all such variations and modifications known to those skilled in the art.

Further, it should be understood that the several views of the housings, displays and general configurations shown in the figures include many decorative or ornamental features, aspects of which the particulars may be changed while maintaining the device's utility and without departing from the scope and spirit of the present invention.

Referring to FIGS. 1-4, a digital tire pressure gauge 100 is illustrated according to an embodiment of the invention. Gauge 100 has a generally encompassing housing or wall 110. In an exemplary embodiment, housing 110 includes a top cover 115 and a bottom wall 120. In other embodiments, housing 110 may have more than or less than two covers. Gauge 100 includes a port 30 adapted to engage with and open the needle valve on a suitable tire valve stem. A tire valve stem is typically in the form of a tube, threaded on the exterior near the end thereof, to permit attachment of a protective cap, and having a valve, referred to variously as a pin valve, bleeder valve, or Schrader valve. This type of valve is kept normally closed by a combination of air pressure and a spring urging a stopper into contact with an opening. A pin extending out of the valve may be urged inward, such as by a piston in a nozzle of a service station air hose, to open the valve to permit the introduction of pressurized air into the tire. Port 30 may include such a pin.

A light source 140 is provided near port 30, and may be employed for illumination. In an exemplary embodiment, light source 140 is a light emitting diode (LED). Light source 140 is operable via a switch 170. In an exemplary embodiment, switch 170 is in form of a push button. An advantage of light source 140 is that a user may use its illumination to locate a tire valve stem in unlit or poorly lit areas and avoid having to grope the tire valve stem.

A grip area 135 is provided on top cover 115 at an end proximal to port 130. In an exemplary embodiment, grip area 135 includes ridges and has a curvature complementing the contours of a human thumb. Top cover 115 further includes a display 150 and a set 155 of buttons. Display 150 includes an alphanumeric display, which may be, for example, a liquid crystal display. Housing 110 further includes a through-aperture 160 at an end proximal to display 150. In an exemplary embodiment, aperture 160 is adapted to receive a lanyard for ease of handling and storage of gauge 100. A bleed lever 145 pivots about points 165 on bottom cover 120 at an end proximal to port 30.

Figure 5:
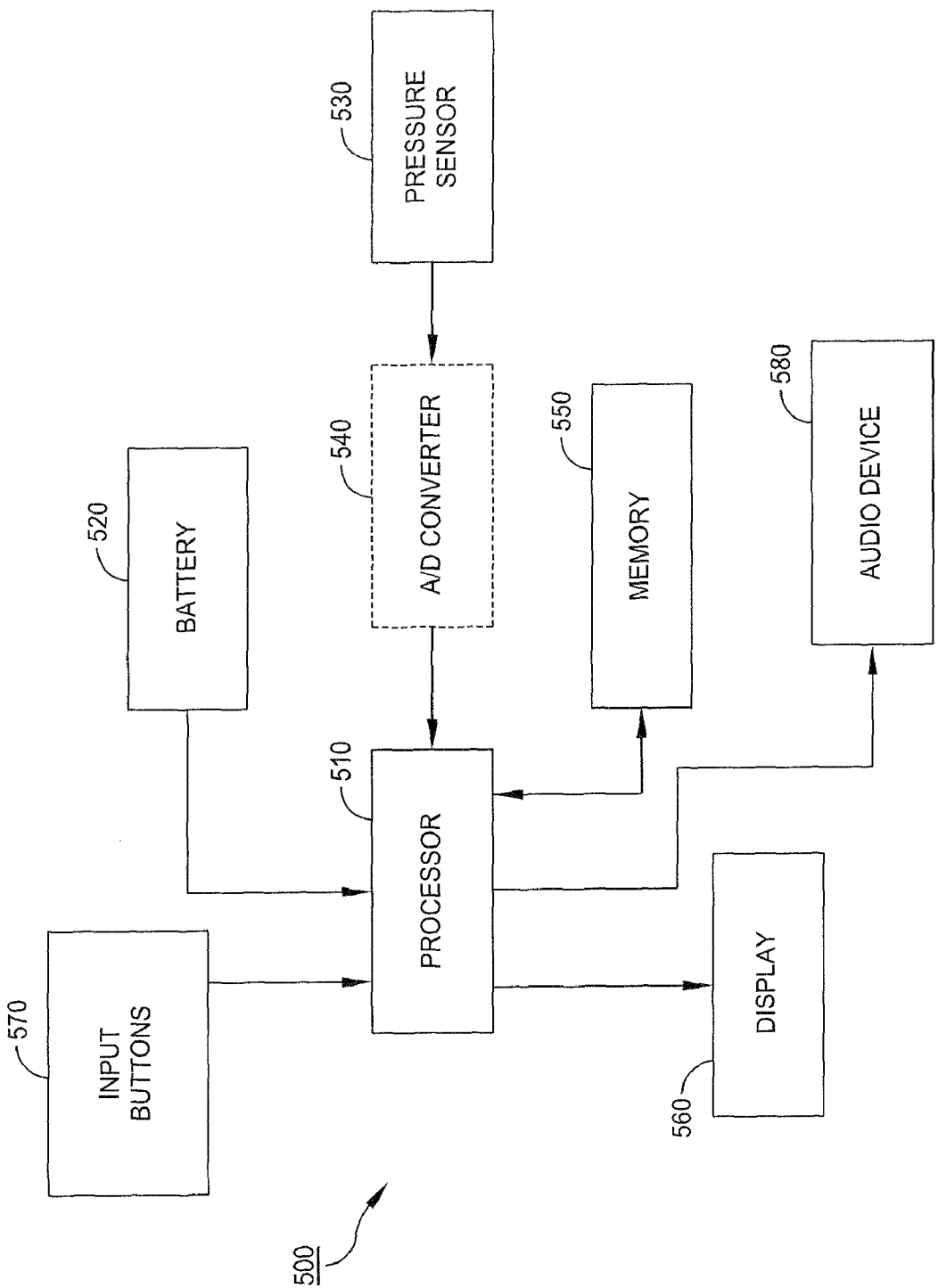
FIG. 5 is a schematic diagram of components of the gauge of FIG. 1, according to an embodiment of the invention.

Gauge 100 includes a pressure sensor (not shown) located within housing 110. Referring now also to FIG. 5, there is shown a block diagrammatic view of an arrangement 500 suitable for use in gauge 100 of FIGS. 1-4. An exemplary arrangement 500 generally includes a processor 510, optional analog to digital (a/d) converter 540, pressure sensor 530, a memory 550, a display 560, an audio device 580, and set 570 of input buttons.

"Processor", as used herein, generally refers to a circuit arrangement that may be contained on one or more silicon chips, and/or integrated circuit (IC) boards, and that contains a Central Processing Unit (CPU). The CPU may generally include an arithmetic logic unit (ALU), which performs arithmetic and logical operations, and a control unit, which extracts instructions from memory and decodes and executes them, calling on the ALU when necessary.

Processor 510 may take the form of a microprocessor, and may be a low power CMOS processor with an embedded analog to digital converter, by way of non-limiting example only. The present invention is operable with computer storage products or computer readable media that contain program code for performing the various computer-implemented operations. The computer-readable medium is any data storage device that can store data which can thereafter be read by a computer system such as a microprocessor. The media and program code may be those specially designed and constructed for the purposes of the present invention, or they may be of the kind well known to those of ordinary skill in the computer software arts. Examples of computer-readable media include, but are not limited to magnetic media such as hard disks, floppy disks, and magnetic tape; optical media such as CD-ROM disks; magneto-optical media; and specially configured hardware devices such as application-specific integrated circuits (ASICs), programmable logic devices (PLDs), and ROM and RAM devices. Examples of program code include both machine code, as produced, for example, by a compiler, or files containing higher-level code that may be executed using an interpreter.

Processor 510 may include multiple inputs and outputs. In the exemplary configuration illustrated in FIG. 5, processor 510 has an input coupled to pressure sensor 530 optionally via analog-to-digital converter (A/D) 540. For example, where pressure sensor 530 provides an analog output signal indicative of a pressure sensed using port 30, A/D converter 540 may communicate a digital signal indicative of the analog signal output from pressure sensor 530 to processor 510. Where pressure sensor 530 provides a digital signal directly, A/D converter 540 may optionally be omitted. Also, where processor 510 is adapted to receive analog signals output from pressure sensor 530 directly, A/D converter 540 may optionally be omitted. A/D converter 540 may be selected based upon size limitations of housing 110, an expected output from pressure sensor 530, accepted input for processor 510 and available power source 520 for gauge 100, for example. Processor 510 may also be coupled to memory 550 to allow it to access its data contents.

Pressure sensor 530 may be any one of a number of conventional sensors for detecting fluid pressure, and particularly air pressure, and selected to provide acceptable response over a range of pressures anticipated in a particular application. By way of example, pressure sensor 530 may incorporate a MEMS based pressure die.

In an exemplary embodiment, set 570 of input buttons includes three buttons: a first button is labeled "SET," a second button is labeled "UP" and a third button is labeled "DOWN." In other embodiments, set 570 may include more than or less than three buttons with different functionalities.

Figure 6:
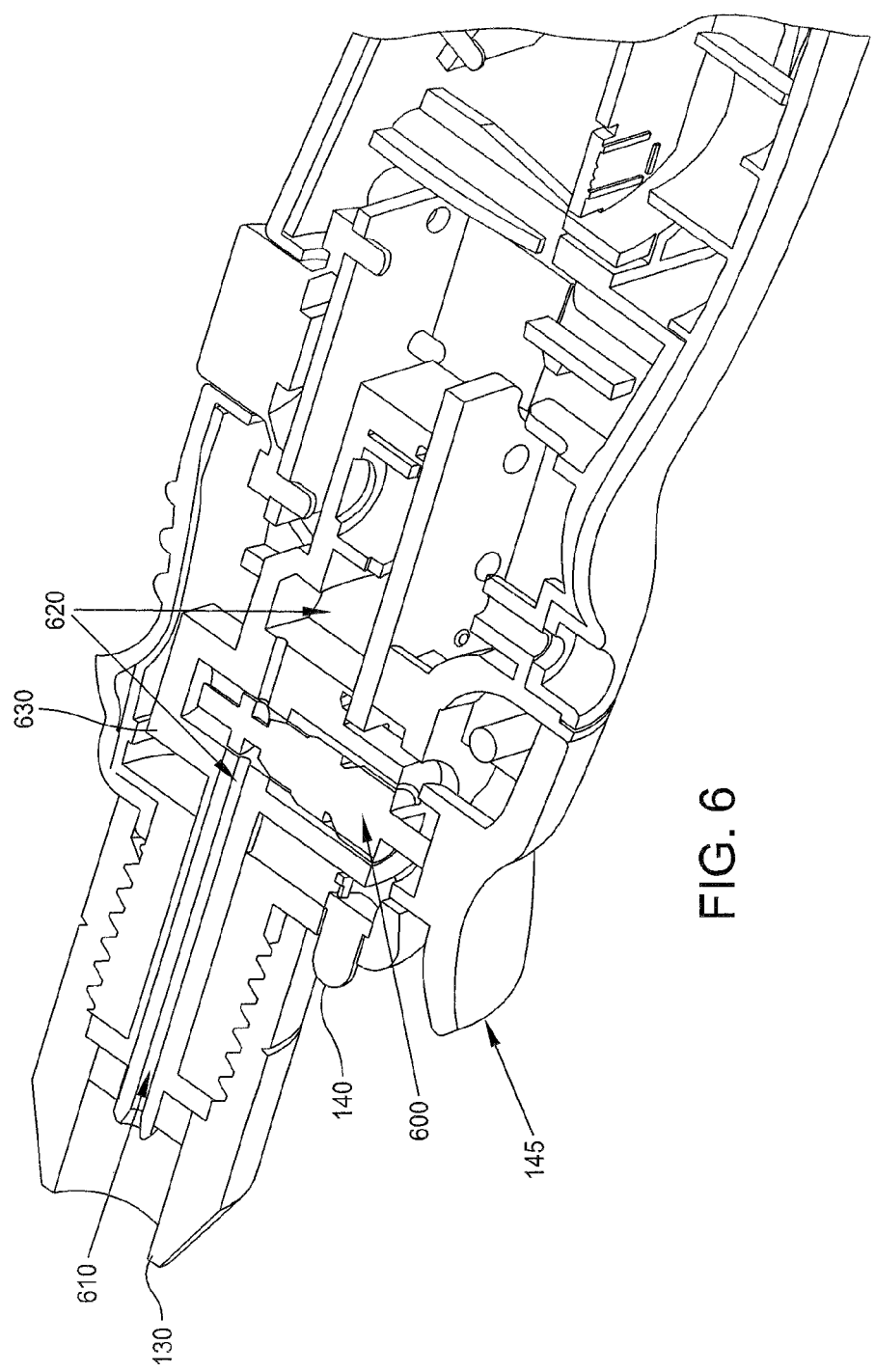
FIG. 6 is a perspective cross-sectional view of the gauge of FIG. 1, according to an embodiment of the invention.

Referring now to FIG. 6, there is illustrated a perspective partial cross-sectional view of gauge 100. A sensor housing 630 is disposed within housing 110. An air passage 610 and an air chamber 620 are defined in sensor housing 630. Air from a tire flow through air passage 610 into air chamber 620. In the illustrated embodiment, a bleed valve 600 is disposed in sensor housing 630. Bleed valve 600 is operable via bleed lever 145.

Figure 7A:
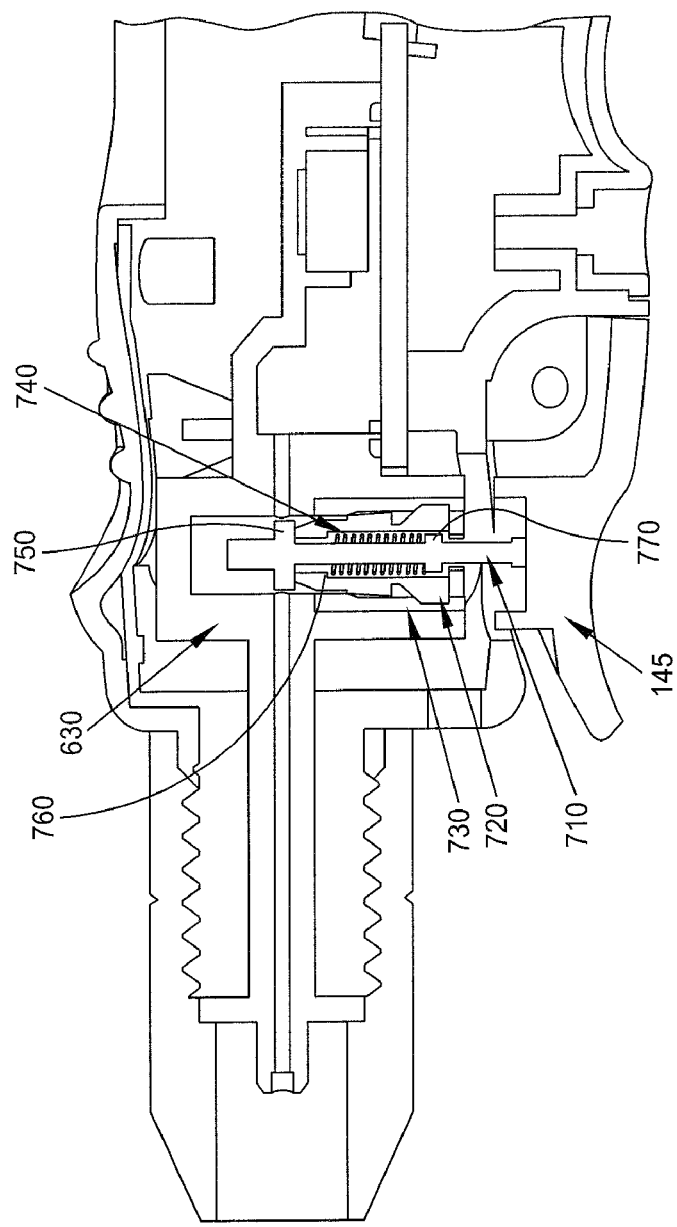
FIG. 7A is a cross-sectional view of the gauge of FIG. 1, wherein the gauge is in a pressure measurement mode with a bleed valve mechanism in a closed state, according to an embodiment of the invention.

Referring now to FIG. 7A, a cross-sectional view of bleed valve 600 in first operational mode is illustrated. In an exemplary embodiment, sensor housing 630 is made of a plastic material, for example, ABS. In the illustrated embodiment, an insert 730 is made of brass and is co-molded with sensor housing 630. The internal surface of insert 730 has internal threads defined thereon. A stem tube 720 has external threads defined on its external surface and is threadedly engaged with insert 730. In an exemplary embodiment, stem tube 720 is made of nickel plated brass. A stem 710 is inserted in stem tube 720. Stem 710 is in contact engagement with bleed lever 145 at a first end. Stem 710 has a first head 750 protruding radially distal from the first end and outside stem tube 720. Stem 710 has a second head 770 protruding radially proximal to the first end and inside stem tube 720. A spring 740 is disposed along stem 710, between second head 770 and a step 760 in stem tube 720. In FIG. 7A, first head 750 is illustrated as covering an opening 760 (of FIG. 7B) of stem tube 720. Bleed valve 600 is, therefore, in a switchable fluid communication with air in the tire.

Figure 7B:
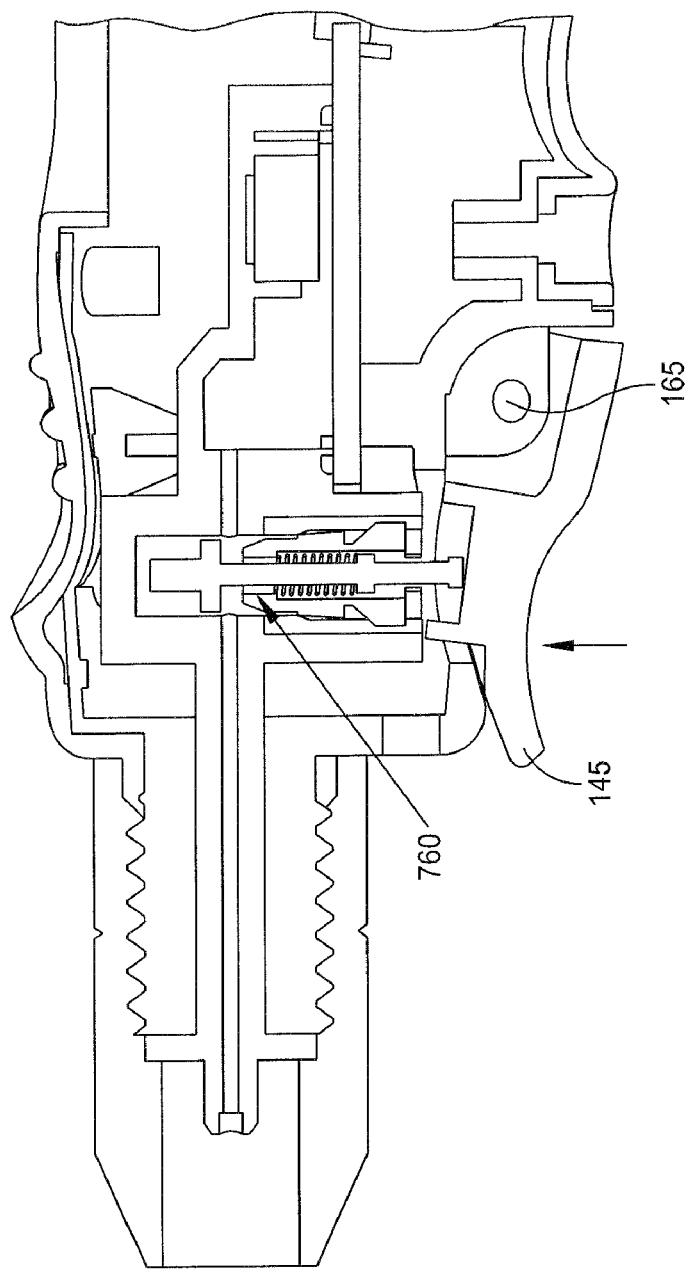
FIG. 7B is a cross-sectional view of the of FIG. 1, wherein the gauge is in a bleeding mode with the bleed valve mechanism in an open state, bleeding air out of the gauge and the tire, according to an embodiment of the invention.

Referring now to FIG. 7B, a cross-sectional view of bleed valve 600 is second operational mode is illustrated. In the second operational mode, when bleed lever 145 is pressed towards gauge 100, lever 145 pivots about point 165 and urges stem 710 further into stem tube 720. Head 750, therefore, is caused to move away from opening 760, thereby creating a pathway for air in air passage 610 and in air chamber 620 to bleed through stem tube 720. Spring 740, which is compressed between second head 770 and step 760 urges stem 710 towards bleed lever 145, when the pressing force on lever 145 is removed. Head 750, thus, closes opening 760, thereby closing the air pathway. Bleed lever 145 is, therefore, adapted to switch on and off the fluidic communication of bleed valve 600 with the air in the tire.

Figure 8:
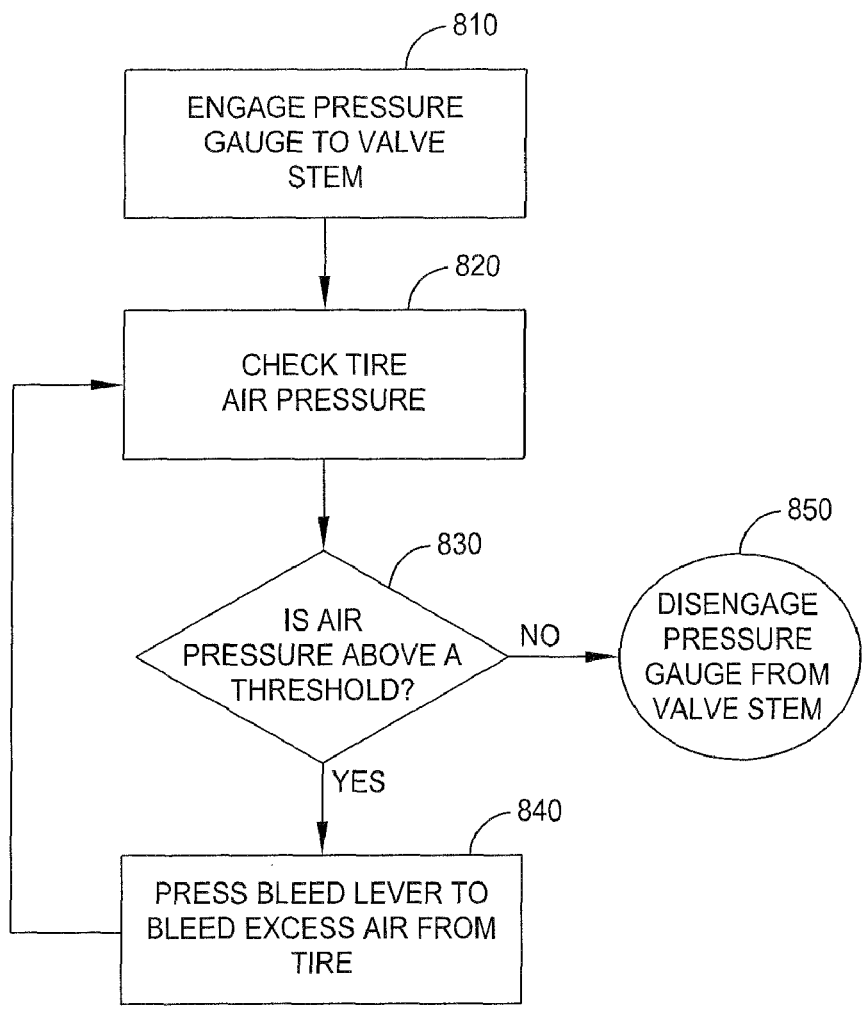
FIG. 8 is a process flow of using the gauge of FIG. 1 to check air pressure and bleed excess air from a tire, if overinflated, according to an aspect of the invention.

Referring now to FIG. 8, a process flow is illustrated for checking air pressure of a tire and for bleeding excess air from the tire, if overinflated. At block 810, pressure gauge 100 is engaged with a valve stem of a tire. The air pressure of the tire is checked in display 150. The user checks whether the measured air pressure is above a threshold, at block 830. If the measured air pressure is not above the threshold, the user disengages the pressure gauge from the valve stem, at block 850. If, however, the measured air pressure is above the threshold, while keeping the pressure gauge engaged with the valve stem, the user presses bleed lever 145 to cause excess air from the tire to bleed out through the pressure gauge, at block 840. The steps in blocks 820, 830, 840 are repeated until the measured air pressure is no longer above the threshold. In an exemplary embodiment, audio device 580 (of FIG. 5) emits a first sound to indicate that gauge 100 has obtained an air pressure reading, which reading is displayed on display 560

(of FIG. 5). In an exemplary embodiment, audio device 580 (of FIG. 5) is adapted to emit a series of sounds to indicate whether the measured air pressure is above or below the threshold pressure.

An advantage of the described embodiment of the invention is that bleed valve 600 facilitates bleeding of air from a vehicle tire without having to remove pressure gauge 100 from a tire valve stem. When a user inflates a tire, it is possible that the user may have inadvertently over-inflated the tire. Conventionally, then the user measures a tire air pressure by engaging a tire pressure gauge to a valve stem. If the measured air pressure is in excess of a desired pressure level, the user has to remove the pressure gauge and manually bleed excess air from the tire. Then the user has to again engage the pressure gauge to check the tire air pressure. These steps have to be repeated until a desired tire pressure threshold is reached. An advantage of the tire pressure with a bleed valve is that the user does not have to remove the pressure gauge from the valve stem; rather, while keeping the pressure gauge engaged with the valve stem, the user simply presses on bleed lever and bleeds excess air from the tire. The user may intermittently stop bleeding excess air by releasing the bleed lever and check the air pressure in the display and repeat the steps until the tire is no longer overinflated.

Figure 9A:
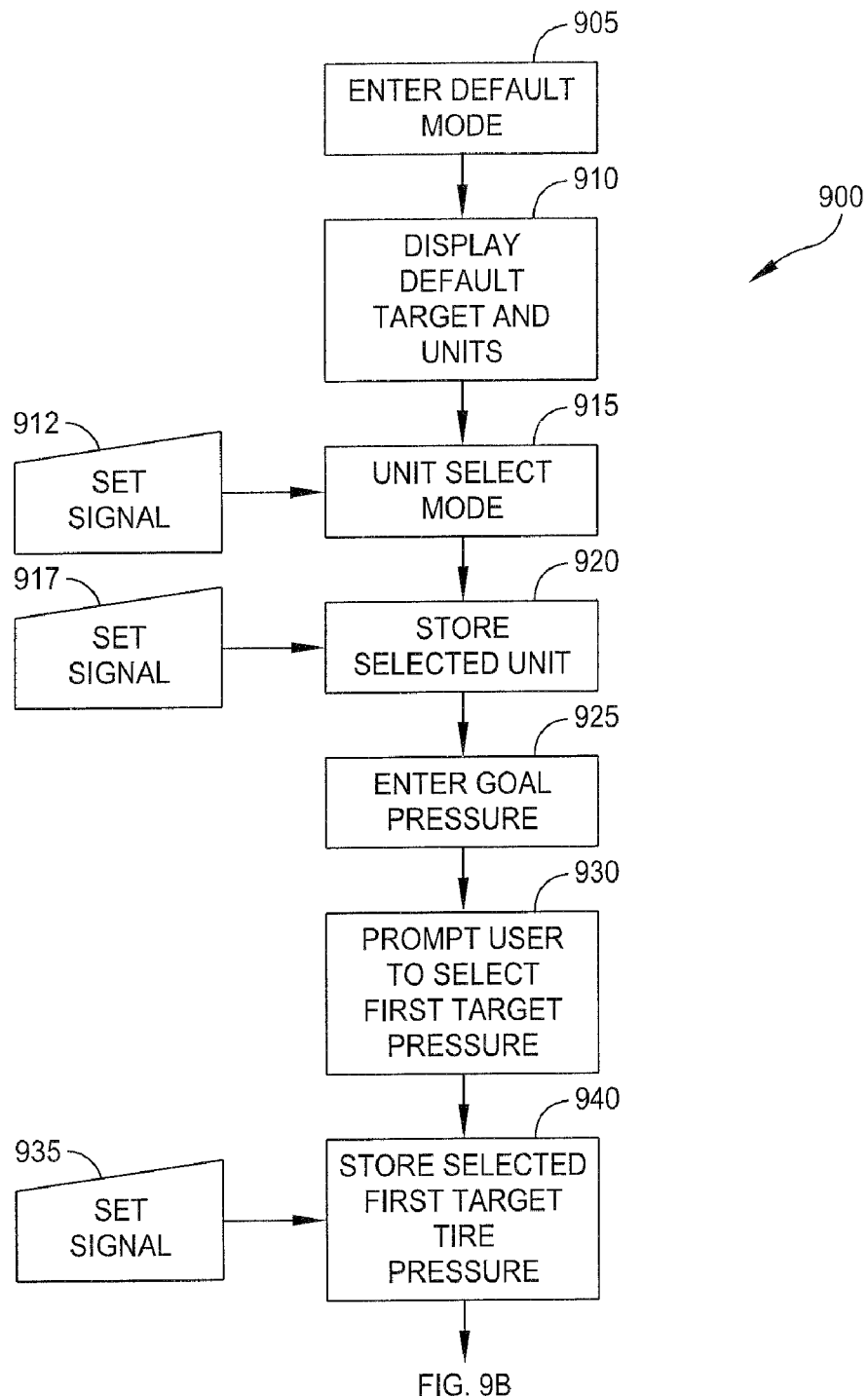
FIGS. 9A and 9B are a process flow diagram of certain steps of preparing the gauge of FIG. 1 for use.
Figure 9B:
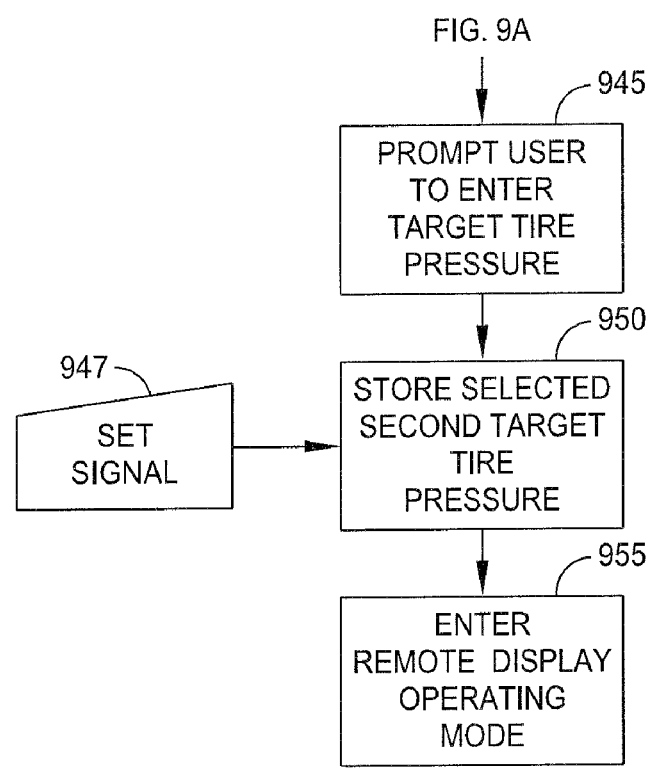

Referring now to FIGS. 9A and 9B, there is shown a block diagrammatic representation of a process 900 according to an aspect of the present invention, and being suitable for use with gauge 100 (of FIG. 1). In an initial step, indicated by block 905, upon initially powering up of gauge 100 (of FIG. 1), the gauge enters a default initial display mode. In the default mode, processor 510 (of FIG. 5) accesses, such as from memory 550 (of FIG. 5), a stored default target pressure, and a stored default unit, and causes that target and unit to be displayed, as indicated by block 910.

In response to a SET signal, as indicated by block 912, gauge 100 enters a display unit select mode, as indicated by block 915. In the display unit select mode, a unit will blink to prompt the user to select a unit. For example, initially, PSI may blink. In response to the user pressing the up and down keys, the unit that is blinking will change. In response to a further SET signal, the unit for display will be selected and stored in memory, as indicated by block 917 and 920, and the device will enter a goal setting mode, as indicated by block 925.

In the goal setting mode, the user is prompted to enter a first target tire pressure, as indicated by block 930. The first tire pressure may be for the front tires, for example. The prompting may take the form of causing the emitters corresponding to a set of wheels, such as the front wheels or the rear wheels, to blink. A default target tire pressure is displayed, and may be incremented up and down in response to pressing of the up and down buttons by the user. When a desired first target tire pressure is displayed, the user may press the SET button. This will generate a SET signal, indicated by block 935, to the processor 510 (of FIG. 5), which will then store, as indicated by block 940, the then-displayed value as the first target tire pressure in memory 550 (of FIG. 5). Referring now to FIG. 9B, the processor may then prompt the user to enter a second target tire pressure, as indicated by block 945. The second target tire pressure may be for the rear tires. The prompting may take the form of causing the emitters corresponding to the rear wheels to blink. A default second target tire pressure may be displayed. The displayed second target tire pressure may be incremented up and down in response to pressing of the up and down buttons by the user. When a desired second target tire pressure is displayed, the user may press the SET button, as indicated by block 947. In response, the processor will store the then-displayed second target tire pressure in memory, as indicated by block 950. The device will then enter the remote display operating mode.

While the foregoing invention has been described with reference to the above-described embodiment, various modifications and changes can be made without departing from the spirit of the invention. Accordingly, all such modifications and changes are considered to be within the scope of the appended claims.

What is claimed is:

1. A digital tire pressure gauge comprising:
a housing having a first and a second end;
a port at said first end of said housing, said port adapted to engage with and open a needle valve of a tire valve stem;
a sensor housing disposed in said housing and defining an air chamber therein;
a pressure sensor disposed in said sensor housing;
a processor in electronic communication with said pressure sensor;
a bleed valve disposed in said sensor housing, said bleed valve comprising:
an insert co-molded with said sensor housing;
a stem tube in engagement with said insert; and
a stem positioned in said stem tube, said stem comprising:
a first head protruding outside said stem tube and adapted to cover an opening of said stem tube; and
a second head positioned inside said stem tube; and
a spring disposed about said stem and seated on said second head; and
a bleed lever in contact engagement with said stem, wherein, when said port is coupled to the tire valve stem, in a first operational mode, said bleed valve is closed and an air pressure measurement is obtained, and, in a second operational mode, said bleed lever, when pressed, causes said bleed valve to open and to allow air to be bled out from the tire via the pressure gauge.

2. The digital tire pressure gauge according to claim 1, further comprising a light source adjacent to said port.

3. The digital tire pressure gauge according to claim 2, further comprising a switch adapted to operate said light source.

4. The digital tire pressure gauge according to claim 3, wherein said switch is a push button.

5. The digital tire pressure gauge according to claim 1, further comprising an alphanumeric display, said display in electronic communication with said processor.

6. The digital tire pressure gauge according to claim 5, wherein said alphanumeric display is adapted to display graphics.

7. The digital tire pressure gauge according to claim 1, further comprising a memory, said memory in electronic communication with said processor.

8. The digital tire pressure gauge according to claim 1, wherein said housing further comprises a grip area at said first end.

9. The digital tire pressure gauge according to claim 8, wherein said grip area comprises a plurality of ridges.

10. The digital tire pressure gauge according to claim 8, wherein said bleed lever is generally aligned with said grip area.

11. The digital tire pressure gauge according to claim 10, wherein said bleed lever is aligned generally opposite to said grip area.

12. The digital tire pressure according to claim 8, said grip area has a curvature complementing the contours of a human thumb, and wherein said bleed lever has a contour generally symmetrical to the curvature of said grip area.

13. The digital tire pressure gauge according to claim 1, wherein said housing further comprises a through-aperture at said second end.

14. The digital tire pressure gauge according to claim 1 further comprising a plurality of input buttons in electronic communication with said processor.

15. The digital tire pressure gauge according to claim 1, further comprising an audio device, said audio device in electronic communication with said processor.

16. The digital tire pressure gauge according to claim 1, further comprising a power source.

17. The digital tire pressure gauge according to claim 1, wherein said sensor housing is of a first material, and wherein said insert is of a second material different from said first material.

18. The digital tire pressure gauge according to claim 17, wherein said first material is a plastic material.

19. The digital tire pressure gauge according to claim 17, wherein said second material is a metal.

20. The digital tire pressure gauge according to claim 1, wherein said sensor housing is made of a plastic material.

21. The digital tire pressure gauge according to claim 20, wherein said insert comprises a metal insert, and wherein said stem tube comprises a metal stem tube.

22. The digital tire pressure gauge according to claim 21, wherein said metal insert is co-molded with said sensor housing.

23. The digital tire pressure gauge according to claim 21, wherein said metal insert comprises internal threads, and wherein said metal stem tube comprises external threads for threadedly engaging with said metal insert.

* * * * *